Patented Feb. 22, 1949

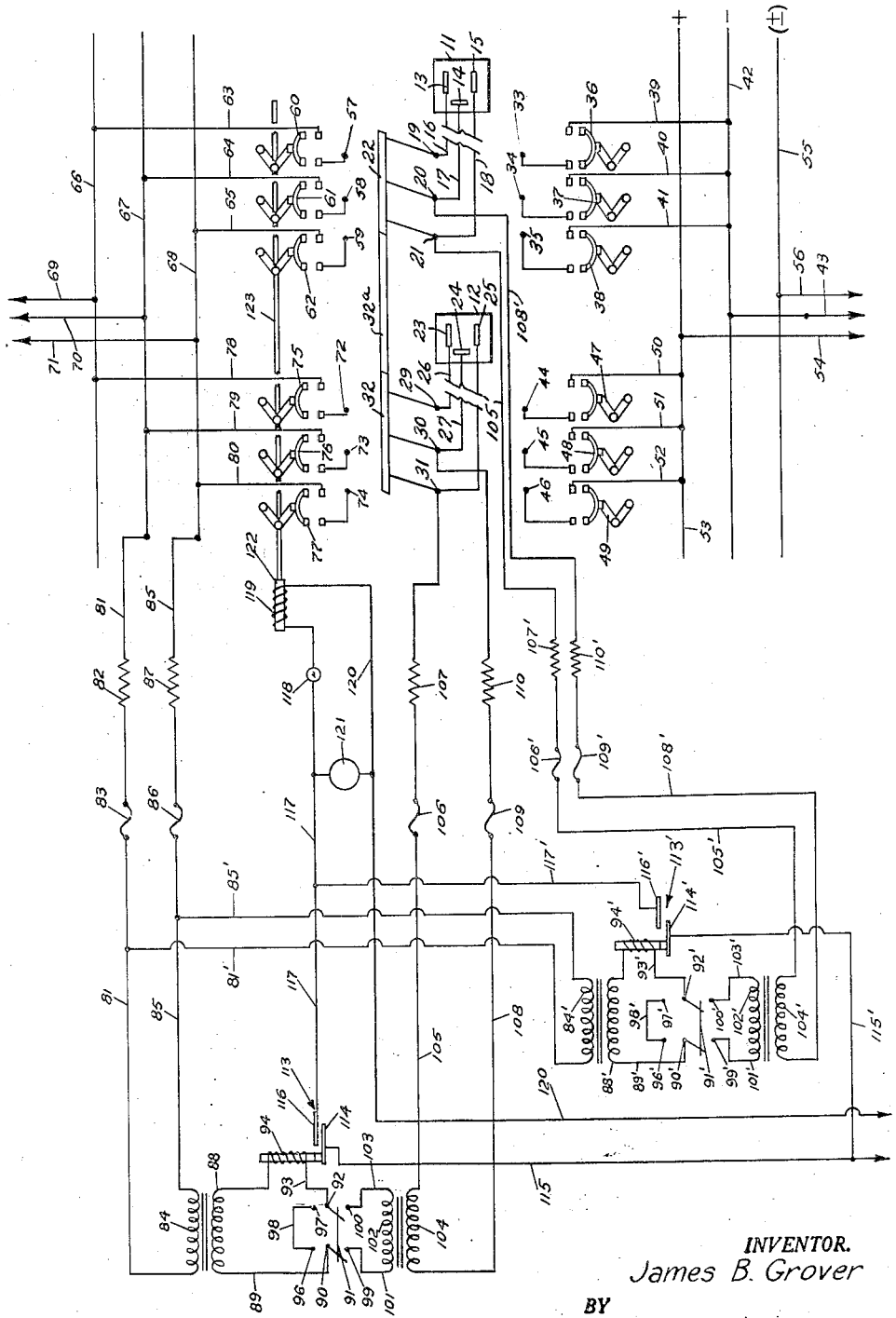

2,462,094

UNITED STATES PATENT OFFICE 2,462,094

ELECTRICAL SAFETY INTERLOCKING SYSTEM

James B. Grover, New York, N. Y.

Application June 30, 1945, Serial No. 602,632

7 Claims. (Cl. 171—97)

(Granted under the act of March 3, 1883, as amended April 30, 1928; 370 O. G. 757)

The present invention concerns an electrical interlock for preventing an electrical circuit from being connected with a source of electrical power when short-circuit conditions exist, and particularly concerns an electrically operated mechanical interlock for use in conjunction with circuit breakers on feeder lines whereby the circuit breakers cannot be closed when short-circuit conditions exist.

It is customary in providing shore-to-ship electrical power at dry docks and other servicing facilities for ships, to arrange banks of multiple female outlets at convenient points along the dry dock. These outlets are connected by feeder lines to remote substations capable of supplying either alternating or direct current. Male plug and portable extension cable assemblies are used for delivering power from the dry dock outlets to the desired points aboard ship. A usual arrangement, for example, provides female outlets of 400 ampere capacity and capable of supplying 440 volt, three-phase alternating current or 250 volt direct current depending upon the requirements of the ship to be serviced, and for this purpose three-wire type feeders are used to connect each outlet with the source of power at the substation.

In order that either alternating current or direct current can be supplied to the outlets, the ends of each set of three-wire feeders remote from the outlets and located in the substation are connected to the terminals of a three-pole double-throw switch which can be closed upon power lines from either a source of alternating current such as a main supply transformer or from a source of direct current such as a motor-generator set. Circuit breakers are provided in the power lines leading both to the alternating-current source and the direct-current source to open the circuit upon dangerous loading or short circuiting of the system.

When the feeder lines are connected at the substation to an alternating-current source, the three feeder lines to any outlet carry three-phase current and each dry-dock outlet is an independent outlet. However, when the feeder lines are connected at the substation to a direct-current source, the dry dock outlets operate in pairs, one outlet of a pair being of positive polarity while the other outlet is of negative polarity. With this direct-current arrangement, all three feeder lines to any one outlet are of the same polarity, and when a male direct-current plug is inserted in such outlet all three feeder lines are electrically connected together at the outlet. This system for electrically connecting together the three-wire feeders for transmitting direct current is advantageous since all three feeder wires leading to any outlet are used for carrying current whereas if the three feeder wires to any outlet were arranged to provide one positive wire, one negative wire and one dead wire, one-third of the feeder wires would be dead and result in inefficient use of the feeders.

Since insertion of a male direct-current plug in any outlet electrically connects together the three feeder lines to such outlet, inadvertent switching at the remote substation from direct current to alternating current with a male direct-current plug in an outlet results in a short circuit. Such a mistake can occur due to the fact that the substation where switching takes place is located at a point remote from the outlets so that the substation operator can be unaware of the fact that an outlet is short circuited by a male direct-current plug. Furthermore, the chance of mistake is increased by use of inexperienced personnel to operate electrical equipment at the dry dock. Clearly the possibility of such a mistake constitutes a potential hazard which can result in serious injury to personnel, damage to electrical equipment and delay necessitated in repairing such damage.

The present invention provides a safety device for automatically preventing the substation operator from closing the circuit to connect the feeder lines to a source of alternating current when short-circuit conditions exist in the feeder line or at the outlet. The safety device embodies a shunt or by-pass circuit connected across the substation switches from the alternating-current power lines to the feeder lines so that current flows in the shunt or by-pass circuit when short-circuit conditions exist in the feeders, and electrical means responsive to such current flow are provided for actuating a mechanical interlock which secures the alternating-current circuit breakers against actuation into closed position.

If desired, an analagous electrically operated interlock can be provided to prevent closing of the direct-current circuit breakers when short circuit conditions exist in the direct-current wiring system.

An object of the invention is to provide electrically operative means for preventing the circuit breaker in a system from being closed when short-circuit conditions exist.

Another object of the invention is to provide electrically operative means for opening the circuit breaker in a system when a short circuit occurs and means for automatically preventing the circuit breaker from being closed so long as short circuit conditions continue to exist.

Another object of the invention is to provide a system of multiple feeder lines adapted for connecting a direct-current source to an outlet with said feeder lines connected together, means for alternately connecting the feeder lines to a source of alternating current whereby the feeder lines are adapted to be disconnected from each other, and an automatic interlock for preventing the alternating-current circuit from being closed while the feeder lines are connected together.

Further objects and advantages of this invention, as well as its construction, arrangement and operation, will be apparent from the following description and claims in connection with the accompanying drawings, in which, the single figure is a diagrammatic showing of a preferred form of the invention.

A pair of outlets 11 and 12 for servicing electrical equipment are adapted for location together at the edge of a dry dock or other facility for servicing ships. Outlet 11 is provided with contacts 13, 14 and 15, connected by means of a set of three feeder lines 16, 17 and 18 with contacts 19, 20 and 21 of a three-pole double-throw switch 22 adapted for location in a substation at a point remote from the dry dock where outlet 11 is located. Outlet 12 is provided with contacts 23, 24 and 25, connected by means of a set of three feeder lines 26, 27 and 28 with contacts 29, 30 and 31 of a three-pole double-throw switch 32 adapted for location adjacent switch 22 in the substation. Switches 22 and 32 are locked for movement together by a mechanical tie rod 32a.

Contacts 33, 34 and 35 on one side of switch 22 are connected through circuit breakers 36, 37 and 38 and through jumper lines 39, 40 and 41 to a common direct-current bus bar 42, that in turn is connected by means of a power line 43 with one terminal of a source of direct current (not shown) such as a motor-generator set. Contacts 44, 45 and 46 on one side of switch 32 are connected through circuit breakers 47, 48, 49 and through jumper lines 50, 51 and 52 to a common direct-current bus bar 53 that in turn is connected by a power line 54 to the other terminal of the direct-current source. A third bus bar 55 can be provided and connected by means of a power line 56 to the direct-current source for auxiliary use.

With switch 22 closed upon contacts 33, 34 and 35, the three feeder lines 16, 17 and 18 are all of the same polarity since the lines are connected to the common bus bar 42 and power line 43. Outlet 11, therefore, is of only one polarity. Simultaneous closing of switch 32 through the medium of tie rod 32a upon contacts 44, 45 and 46 causes the three feeder lines 26, 27 and 28 to connect with bus bar 53 and power line 54 which is of opposite polarity to the three feeder lines 16, 17 and 18. Outlet 12, therefore, is of a polarity opposite to outlet 11. In direct-current operation, therefore, outlets 11 and 12 are used together in a pair, one of the outlets providing positive polarity and the other outlet providing negative polarity. The direct-current male plugs (not shown) used for insertion in outlets 11 and 12 are designed to connect contacts 13, 14 and 15 or contacts 23, 24 and 25 together electrically during direct-current operation. This arrangement of feeders whereby during direct-current operation all three of the feeder lines 16, 17 and 18 are of one polarity and are connected together at outlet 11 while all three of feeder lines 26, 27 and 28 are of the opposite polarity and are connected together at outlet 12, is provided to afford most efficient use of the feeder lines since by this arrangement all three of the feeder lines leading to a particular outlet are carrying current, whereas if one feeder line such as 16 was carrying current of one polarity and the second feeder line 17 was carrying current of opposite polarity, the third feeder line 18 would not be carrying current, thus resulting in inefficient use of the feeder lines.

In the wiring system for providing alternating current to outlets 11 and 12 contacts 57, 58 and 59 of switch 22 are connected through circuit breakers 60, 61 and 62 and through jumper lines 63, 64 and 65 to alternating-current bus bars 66, 67 and 68 in turn are connected through power lines 69, 70 and 71 to a source of alternating current (not shown) such as a main supply transformer. Circuit breakers 60, 61 and 62 can be of the type to provide time delay and instantaneous trip features for giving overload and short-circuit protection respectively when the system is in alternating-current operation or separate circuit breakers for this purpose can be provided. If desired, three-phase alternating current can be provided from the source. Contacts 72, 73 and 74 of switch 32 are connected through circuit breakers 75, 76 and 77 and through jumper lines 78, 79 and 80 to alternating-current bus bars 66, 67 and 68. Circuit breakers 75, 76 and 77 are similar to circuit breakers 60, 61 and 62 and can provide overload and short-circuit protection during alternating-current operation or separate circuit breakers for this purpose can be provided.

When switch 22 is closed upon contacts 57, 58 and 59, the three feeder lines 16, 17 and 18 are arranged to carry three-phase alternating current and outlet 11 operates independently of outlet 12. Simultaneously closing of switch 32 through the medium of tie rod 32a upon contacts 72, 73 and 74, causes the three feeder lines 26, 27 and 28 to carry three-phase alternating current and outlet 12 operates independently of outlet 11. Therefore, in alternating-current operation outlets 11 and 12 are used independently and are not used in pairs as is the case with direct-current operation. The alternating-current male plugs (not shown) for insertion in outlets 11 and 12 are designed not to connect contacts 13, 14 and 15 or contacts 23, 24 and 25 together electrically and in this respect differ from the direct-current male plugs.

Since the direct-current male plugs are designed to connect together the contacts in an outlet, for example, contacts 13, 14 and 15 of outlet 11, if a male direct-current plug is inserted in outlet 11 when switch 22 is closed upon contacts 57, 58 and 59 to provide alternating current, short-circuit conditions exist. Since switch 22 is adapted for location in a substation remote from outlet 11, switch 22 might inadvertently be closed into alternating-current position while a male direct-current plug is inserted in outlet 11 to create short-circuit conditions. To prevent this from happening, the following automatic interlock is provided for insuring that circuit breakers 60, 61 and 62, and circuit breakers 75, 76 and 77 cannot be closed while such short-circuit conditions prevail.

A shunt or by-pass circuit is provided including a conductor 81, connected at one end to alternating-current bus bar 67, and connected through a current-limiting resistance 82 and fuse 83 to one end of transformer primary 84, the other end of which is connected by conductor 85 through fuse 86 and current-limiting resistance 87 to alternating current bus bar 68. Transformer secondary winding 88 is connected at one end by conductor 89 to terminal 90 of a double-pole double-throw switch 91, the other terminal 92 of which is connected by conductor 93 through a clapper-type relay 94 to the other end of transformer secondary 88. Switch 91 is provided on one side with contacts 96 and 97 connected together at 98. On the other side, switch 91 is provided with contacts 99 and 100. Contact 99 is connected by conductor 101 to one end of a transformer secondary 102 the other end of which is connected by conductor 103 to contact 100. One end of transformer primary 104 is connected by conductor 105 through a fuse 106 and a current-limiting resistor 107 to contact 31 of switch 32. The other end of transformer primary 104 is connected by a conductor 108 through fuse 109 and current-limiting resistor 110 to contact 30 of switch 32.

A second shunt circuit is provided including a conductor 81', connected at one end to conductor 81 and at its other end connected to one end of transformer primary 84', the other end of which is connected by conductor 85' to conductor 85. Transformer secondary winding 88' is connected at one end by conductor 89' to terminal 90' of a double-pole double-throw switch 91', the other terminal 92' of which is connected by conductor 93' through a clapper type relay 94' to the other end of transformer secondary 88'. Switch 91' is provided on one side with contacts 96' and 97' connected together at 98'. On the other side, switch 91' is provided with contacts 99' and 100'. Contact 99' is connected by conductor 101' to one end of a transformer secondary 102' the other end of which is connected by conductor 103' to contact 100'. One end of transformer primary 104' is connected by conductor 105' through a fuse 106' and a current-limiting resistor 107' to contact 21 of switch 22. The other end of transformer primary 104 is connected by a conductor 108' through fuse 109' and current limiting resistor 110' to contact 20 of switch 22.

Adjacent clapper-type relay 94 and adapted for actuation thereby is a relay switch 113 having a contact 114 connected through a conductor 115 to one terminal of a suitable source of current (not shown). The other contact 116 of switch 113 is connected by a conductor 117 through a signal lamp 118 to a trip coil 119 and by a conductor 120 to the other terminal of the current source (not shown). An alarm signal 121 is connected across lines 117 and 120. Trip coil 119 is provided with a laminated plunger 122 connected to circuit breaker 77. A mechanical tie bar 123 locks circuit breakers 60, 61, 62 and 75, 76 and 77 for movement together under the influence of trip coil 119 and laminated plunger 122.

Adjacent clapper type relay 94' and adapted for actuation thereby is a relay switch 113' having a contact 114' connected through a conductor 115' to conductor 115. The other contact 116' of switch 113' is connected by a conductor 117' to conductor 117.

Operation of the device is as follows. Assume switches 22 and 32 to be in open position as shown in the figure and assume that short-circuit conditions exist, for example, between feeder lines 27 and 28 by virtue of a male direct-current plug being inserted in outlet 12, or for other reasons. It is necessary under such conditions that the alternating circuit be prevented from being closed. This is accomplished by automatic locking in open-circuit position of circuit breakers 60, 61, 62 and 75, 76 and 77 under the influence of trip coil 119 in the following manner. Switches 91 and 91' during normal operation are closed upon contacts 99 and 100 and contacts 99' and 100' respectively. Under such conditions if a short circuit exists as described between feeder lines 27 and 28, the impedence of transformer 104 is reduced almost to short circuit impedence so that current flows through conductors 81 and 85, transformer windings 84 and 88, clapper type relay 94, switch 91, transformer windings 102 and 104, conductors 105 and 108, feeder lines 27 and 28 and the short circuiting male plug in outlet 12. Such current flow actuates clapper type relay 94 to close switch 113 so that current flows through conductors 115 and 120 and trip coil 119. Trip coil 119 is energized to cause reciprocation of laminated plunger 122 which through mechanical tie rod 123 locks circuit breakers 60, 61, 62 and 75, 76 and 77 open until short-circuit conditions are eliminated. At the same time, lamp 118 is illuminated to give a visual indication that short-circuit conditions exist and alarm 121 is activated to give a further indication that short-circuit conditions exist.

In a similar manner if switches 22 and 32 are in open position and short-circuit conditions exist, for example, between feeder lines 17 and 18 by virtue of a male direct-current plug being inserted in outlet 11 or for other reasons, circuit breakers 60, 61, 62 and 75, 76 and 77 are automatically locked in open circuit position as follows. The short circuit described reduces the impedance of transformer 104' so that current flows through conductors 81' and 85', transformer windings 84' and 88', clapper type relay 94', switch 91', transformer windings 102' and 104', conductors 105' and 108', feeder lines 17 and 18 and the short circuiting male plug in outlet 11. Such current flow actuates clapper type relay 94' to close switch 113' so that current flows through conductors 115, 115', 117', 117 and 120 and trip coil 119. Trip coil 119 is energized to cause reciprocation of laminated plunger 122 which through mechanical tie rod 123 locks circuit breakers 60, 61, 62 and 75, 76 and 77 open until short-circuit conditions are eliminated. At the same time, lamp 118 is illuminated to give a visual indication that short-circuit conditions exist and alarm 121 is activated to give a further indication that short-circuit conditions exist.

Thus, should a male direct current plug be inadvertently inserted in either receptacle 11 or receptacle 12, circuit breakers 60, 61, 62 and 75, 76 and 77 are locked automatically in open circuit position.

However, assume switches 22 and 32 to be in open position as shown in the figure and conditions as described in the preceding paragraph, but assume that no short circuit conditions exist either at outlets 11 and 12 or in feeder lines 16, 17, 18 or 26, 27 and 28. Under such conditions current does not flow through the shunt circuit including conductors 81, 85, 105 and 108 since open circuit conditions exist at contacts 30 and 31 of switch 32. Also under such conditions current does not flow through the shunt circuit including conductors 81', 85', 105' and 108' since open circuit conditions exist at contacts 20 and 21 of switch 22. The impedances of secondary transformer windings 104 and 104' under these conditions are high enough to prevent current flow. Therefore, trip coil 119 is not energized and the alternating current circuit breakers 60, 61, 62 and 75, 76 and 77 are not locked in open position but can be closed to condition the circuit for alternating-current operation when switches 22 and 32 are closed on contacts 57, 58, 59 and 72, 73 and 74 respectively.

Assuming switches 22 and 32 are closed for direct-current operation upon contacts 33, 34, 35 and 44, 45 and 46, respectively, with switch 91 closed upon contacts 99 and 100, and with switch 91' closed upon contacts 99' and 100', and that direct-current male plugs are inserted in outlets 11 and 12 for operating direct-current electrical equipment, the alternating current circuit breakers 60, 61, 62 and 75, 76 and 77 are locked in open-circuit position. This is true since contacts 19, 20 and 21 of switch 22 are electrically interconnected both by presence of a direct current male plug in outlet 11 and connection of jumper lines 39, 40 and 41 to a common bus bar 42, and in the same manner contacts 29, 30 and 31 of switch 32 are electrically interconnected. Because contacts 20 and 21 of switch 22 are interconnected and contacts 30 and 31 of switch 32 are interconnected, current flows through the shunt or by-pass circuit which includes conductors 81, 85, 105 and 108 and also through the shunt or by-pass circuit which includes conductors 81', 85', 105' and 108' whereby trip coil 119 is energized to lock alternating-current circuit breakers 60, 61, 62 and 75, 76 and 77 in open-circuit position.

Assuming now that all direct-current male plugs are removed from outlets 11 and 12 and that feeder lines 16, 17, 18 and 26, 27 and 28 are otherwise free from short circuits and further that switch 91 is closed upon contacts 99 and 100, and switch 91' is closed upon contacts 99' and 100', the system can be conditioned for alternating-current operation by closing switches 22 and 32 upon contacts 57, 58, 59 and 72, 73 and 74 respectively and closing circuit breakers 60, 61, 62 and 75, 76 and 77. Under such conditions equal potential exists at bus bar 67 and contact 30 of switch 32, also equal potential exists at bus bar 68 and contact 31. Inasmuch as transformer secondaries 89 and 102 are connected in opposed polarity, only a small magnetizing current flows in the circuit including conductors 81, 85 and 105 and 108, and such small current is not sufficient to energize relay 94. For similar reasons, only a small magnetizing current flows in the circuit including conductors 81', 85' and 105', 108' and such small current is not sufficient to energize relay 94'. Therefore, trip coil 119 is not energized and the alternating-current circuit breakers 60, 61, 62 and 75, 76 and 77 are not locked in open position.

By the arrangement described, continuous automatic guarding of the electrical system against improper operation is provided. When the system is in closed-circuit condition and operating either with alternating current or direct current an automatic guard against overload and short-circuit operation can be provided by use of conventional alternating current and direct current breakers respectively of the type which have time delay and instantaneous trip features. Should short-circuit conditions arise when the substation switches are open, the alternating-current circuit breakers are automatically interlocked against closing to guard the system in the manner described hereinbefore.

Should it be desired selectively to lock alternating-current circuit breakers 60, 61, 62 and 75, 76 and 77 in open position, for example, when repair work is being performed on outlets 11 and 12, switch 91 is closed upon contacts 96 and 97. Under such conditions, connection 98 provides a short circuit whereby current flows through conductors 81 and 85, transformer windings 84 and 88, and clapper type relay 94 to close switch 113 and cause trip coil 119 to be energized and lock alternating-current circuit breakers 60, 61, 62 and 75, 76 and 77 in open position. In like manner switch 91' can be closed upon contacts 96' and 97' to energize trip coil 119.

It is to be understood that a direct-current interlock analogous to the alternating-current interlock can be provided for locking the direct-current circuit breakers against closing when short-circuit direct-current conditions exist, if desired. In such case conductors analogous to 81 and 85 can be connected to bus bars 42 and 53, respectively. A conductor analogous to conductor 105 can be connected to contact 29, 30 or 31 of switch 32 and a conductor analogous to conductor 108 can be connected to contact 19, 20 or 21 of switch 22. Transformers are omitted since such a shunt circuit is direct current operated.

While for purposes of illustration there have been disclosed only two outlets, 11 and 12, with corresponding feeder lines, it is understood that more outlets and corresponding feeder lines can be used as required. Furthermore, while a three-wire three-phase alternating-current system is disclosed and a three-wire direct-current system is disclosed, any desired type of alternating-current system with suitable number of wires can be used and any desired direct-current wiring system may be used.

The shunt circuit providing the automatic interlocking action is illustrated as being connected to only two wires of a three-wire system of feeders, but it is understood that the shunt circuit can be arranged for connection to any suitable combination of feeders including all of the feeders if desired.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In an electrical system, a line adapted to connect a power source and a load, circuit breaking means in said line adapted to be disposed in open-circuit or closed-circuit relation, and a by-pass circuit connected across the circuit breaking means, and including means electrically energized during existence of a short-circuit condition at the load to retain said circuit breaking means in open-circuit relation.

2. In an electrical system, a line adapted to connect a power source and a load, circuit breaking means in said line adapted to be disposed in open-circuit or closed-circuit relation, and a by-pass circuit connected across the circuit breaking means and including electromagnetic means responsive to flow of current in the by-pass circuit upon existence of a short circuit condition at the load for retaining said circuit-breaking means in open-circuit relation.

3. In an electrical system, a line adapted to connect a power source and a load, circuit breaking means in said line adapted to be disposed in open-circuit or closed-circuit relation, and a by-pass circuit connected across the circuit-breaking means, a second line adapted to connect a source of power with an electromagnetic device, means interconnecting said electromagnetic device and said circuit breaking means for retaining the circuit breaking means in open-circuit relation upon flow of current in the second line, a switch in the second line, and electromagnetic means responsive to flow of current in the by-pass circuit during existence of a short circuit condition at the load for closing the switch in the second line to permit flow of current in the second line.

4. In an electrical system, a line adapted to connect a source of power and a load, circuit breaking means in said line adapted to be disposed in open-circuit or closed-circuit relation, and a by-pass circuit connected across the circuit-breaking means, said by-pass circuit including a transformer having one winding connected to the power source part of the line and the other winding connected to the load part of the line, and means responsive to flow of current in the by-pass circuit during existence of a short-circuit condition at the load to retain said circuit-breaking means in open-circuit relation.

5. In an electrical system, a line adapted to connect a source of power and a load, circuit breaking means in said line adapted to be disposed in open-circuit or closed-circuit relation, a by-pass circuit connected across the circuit-breaking means including a first transformer and a second transformer, the primary winding of the first transformer being connected to the power source part of the line, the primary winding of the second transformer being connected to the load part of the line, the secondary windings of the transformers being connected in series in opposed relation, and means responsive to flow of current in the by-pass circuit during existence of a short-circuit condition at the load to retain said circuit breaking means in open-circuit relation.

6. In an electrical system, a line adapted to connect a power source and a load, circuit breaking means in said line adapted to be disposed in open-circuit or closed-circuit relation, and a by-pass circuit connected across the circuit breaking means including a first transformer and a second transformer, the primary winding of the first transformer being connected to the power source part of the line, the primary winding of the second transformer being connected to the load part of the line, the secondary windings of the transformers being connected in series in opposed relation, a second line adapted to connect a second source of power with an electromagnetic device for retaining the circuit-breaking means in open circuit relation upon flow of current in the second line, a switch in the second line, and a relay responsive to flow of current in the by-pass circuit during existence of a short circuit condition at the load for closing the switch in the second line to permit flow of current in the second line.

7. In an electrical system, a multiple-pole double throw switch adapted for connection to a load, a first line adapted to connect a first set of switch poles with a source of potential difference, a second line adapted to connect a second set of switch poles with a common conductor so that said switch can connect the load with the source of potential difference or the common conductor, circuit breaking means in said first line adapted to be disposed in open-circuit or closed-circuit relation, and a by-pass circuit connected across the circuit breaking means, and including means electrically energized to retain said circuit breaking means in open circuit relation when the load is connected to the common conductor or when a short-circuit condition exists at the load.

JAMES B. GROVER.

REFERENCES CITED

The following references are of record in the file of this patent:

UNITED STATES PATENTS

| Number | Name | Date |
|---|---|---|
| 529,265 | Harrison | Dec. 13, 1894 |
| Re. 13,856 | Raney | Dec. 29, 1914 |
| 1,435,255 | Puxon | Dec. 14, 1922 |